US012192800B2

(12) United States Patent
Charipadi

(10) Patent No.: US 12,192,800 B2
(45) Date of Patent: Jan. 7, 2025

(54) SYSTEM AND METHOD FOR FACILITATING FAIL SAFE NODES IN A NETWORK

(71) Applicant: Radisys India Private Limited, Karnataka (IN)

(72) Inventor: Gopikrishna Charipadi, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 272 days.

(21) Appl. No.: 17/710,268

(22) Filed: Mar. 31, 2022

(65) Prior Publication Data

US 2023/0232255 A1 Jul. 20, 2023

(30) Foreign Application Priority Data

Jan. 19, 2022 (IN) .............................. 202241003084

(51) Int. Cl.
*H04W 24/04* (2009.01)

(52) U.S. Cl.
CPC .................... *H04W 24/04* (2013.01)

(58) Field of Classification Search
CPC ...... H04W 24/00; H04W 24/02; H04W 24/04; H04W 52/0274; H04W 52/028
See application file for complete search history.

(56) References Cited

U.S. PATENT DOCUMENTS

2010/0014437 A1* 1/2010 Wang .................... H04L 1/0052
370/252
2022/0391286 A1* 12/2022 Moore .................... G06F 9/546

FOREIGN PATENT DOCUMENTS

CN 113301103 A * 8/2021 .......... H04L 43/0811

* cited by examiner

*Primary Examiner* — Khoa Huynh

(74) *Attorney, Agent, or Firm* — FINNEGAN, HENDERSON, FARABOW, GARRETT & DUNNER LLP.

(57) ABSTRACT

The present invention provides an efficient and reliable systems and methods for facilitating FAIL SAFE possibilities in a Network by exploiting 3GPP defined Radio Resource Control (RRC) T310 (Radio-Link Failure Timer), N310 (Radio-Link Failure Counter), T311 (Radio Link Re-establishment Timer), N311 (Radio Link Re-establishment Counter) Timers and associated Counters to enable the L1 to recover within the combined duration of the sum of T310 and T311 timers, for example, typically, 100 msec following a L1 SW exception event.

20 Claims, 2 Drawing Sheets

SYSTEM AND METHOD FOR FACILITATING FAIL SAFE NODES IN A NETWORK

FIELD OF INVENTION

The embodiments of the present disclosure generally relate to telecommunication deployment. More particularly, the present disclosure relates to systems and methods for facilitating fail safe possibilities in a Network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A wireless Communication system consists of a gNodeB Digital Unit (DU) which is coupled to at least one Radio Unit via which the gNodeB transmits and receives wireless Radio Frequency signals to and from the User Equipments (UEs) under the coverage area of the Radio Unit. The Digital Unit houses the Layer1 (L1) and Layer2 (L2) and Layer3 (L3) protocols of the 5G wireless standards protocol stack. In such wireless communications system deployed in the live networks, two predominant criteria should be met by gNode-B/Core Network Subsystem. The criteria are (a) High availability which is often quoted as FIVE 9 s criterion i.e., 99.999% availability and (b) Low gNodeB downtime which is, for example, 21 minutes/year/gNodeB. Also the Key Peformance Indicators (KPIs) of Network defined by the 3G Partnership Project specifications (3GPP), for example, Call drop rate<0.1%; Call success rate>99.5% etc have to be met as Service Level Agreements (SLA) of Network Operator by gNodeB Other Equipment Manufacturers (OEMs).

In the state-of-the-art, when the L1 Software (L1 SW) were to encounter an unexpected software error then the software is asserted so that it will crash and consequently when the Layer 2 Software (L2 SW) that drives the L1 SW does not receive the periodic heartbeat from the L1 SW, the L2 SW will communicate to the Layer 3 Software (L3 SW) to stop the cell transmission and reception which finally leads to the whole DU housing the L1 SW, L2 SW and L3 SW to reboot or restart again. This typically takes the order of minutes and during this time there is service outage in the live network and the network is considered out of service in that geographical area. In the State-of-the-art when an unexpected L1 SW event occurs the L1 SW hits an Assert condition leading to the L1 SW to crash. When there is no response from L1 SW for consecutive TTIs (Transmission Time Interval), say 15 TTIs, the L2 SW realises that something is wrong and then informs the L3 SW. The L3 SW could inform the Core Network that the Cell is down and the Core Network could delete the Cell and start the Cell again, afresh. The time-elapsed between the unexpected L1 SW event occurring and restarting the Cell again typically takes a few seconds. Consequently, the configured 3GPP timers, T310 and T311 timers fire (time-out) on the UEs and all the UEs will go into IDLE state, drop the call and the Network KPIs are severely compromised.

Typically, a part of the 5G wireless L1 protocol stack is implemented in Hardware Accelerators which performs Low-Density Parity Check (LDPC) and Rate Matching in the DL Processing chain and LDPC and Rate de-matching operations in the UL Processing chain, for example. This Architecture enables above computation intensive operations to be offloaded to the Hardware Accelerator for time-efficiency, rather than do it in Software. The Hardware Accelerators are driven with configuration provided by the L1 SW in accordance with the DL CONFIG REQUEST and UL CONFIG REQUEST messages received every 0.5 msec TTI from L2 SW. At times, if there are out-of-range attributes received from L2 SW or unexpected attributes passed on by L1 SW to the Hardware Accelerator in a TTI, it could lead to the Hardware Accelerator to take considerable cycles to complete or not complete at all in some cases. In the state-of-the art L1 SW implementations, this could lead to the L1 SW crashing and then the L2 SW not receiving a response for a few TTIs leading to eventually, the DU software rebooting. It would take seconds for the gNodeB to be operational again and this leads to Network outage and all the connected UEs experiencing dropped calls.

Therefore, there is a need in the art to provide systems and methods that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to build a Network where the Nodes FAIL SAFE.

An object of the present disclosure is to provide a system that facilitates minimal Network Outage time such that the Network KPIs are impacted as minimal as possible.

An object of the present disclosure is to provide a method that enables L1 SW to meet the High Availability and is a defense for gNodeB against any unexpected L1 SW exception in live deployments.

SUMMARY

This section is provided to introduce certain objects and aspects of the present disclosure in a simplified form that are further described below in the detailed description. This summary is not intended to identify the key features or the scope of the claimed subject matter.

An aspect of the present disclosure provides for a system for facilitating minimal cell outage and minimal key performance indicators (KPI) degradation by ensuring fail safe nodes. The system may include a cell and characterized in that a plurality of user equipment (UE) communicatively coupled to a network, one or more electronic devices (gnodes) in the network configured to perform any or a combination of creating, receiving, and transmitting information over a communication channel communicatively coupled to the plurality of user equipments, one or more hardware accelerators communicatively coupled to the one or more gnodes. The one or more hardware accelerators may be configured by a Layer 1 (L1) module to process the information received over the communication in accordance with an uplink and a downlink configuration instruction received every predefined transit time interval (TTI) received from an Layer 2 (L2) module associated with the network. The L1 module is associated with a physical (PHY) layer of the network, and wherein L2 module is associated with a data link layer of the network. The L1 module may further include a processor that executes a set of executable instructions that are stored in a memory, upon execution of which, the processor causes the L1 layer to monitor, one or more discrepancies in the information received by the one or more hardware accelerators; extract, from the one or more discrepancies, a set of attributes pertaining if to out-of-range attributes received from the L2 module or unexpected attributes passed on by the L1 module to the one or more hardware accelerators in the predefined TTI that leads to the one or more hardware accelerator to take excess cycles to complete processing the information or not complete at all. Based on the set of attributes extracted, the L1 module may reset any or a combination of one or more queues in the hardware accelerator and a core of the Hardware Accelerator. The reset may take a predefined outage time interval such that the predefined outage time interval is less than an expiry time associated with a radio-link failure timer (T310) timer coupled to the network. The resetting the any or a combination of one or more queues in the hardware accelerator and the core of the hardware accelerator is performed in parallel with simultaneously performing a request-response communication by the L1 module with the L2 module for a predefined interval of time. The request-response communication may include sending an error message to L2 module such that the L2 module may deactivate functioning of the L1 module until the combination of one or more queues in the hardware accelerator and the core of the hardware accelerator are restarted. Further, the plurality of UEs in the cell may be configured to be in a radio resource connect (RRC) connected state since the predefined outage time interval is less than the expiry time of the T310 timer.

An aspect of the present disclosure provides for a method for facilitating minimal cell outage and minimal key performance indicators (KPI) degradation by ensuring fail safe nodes. The method may include the steps of monitoring, one or more discrepancies in an information received by one or more hardware accelerators communicatively coupled to one or more electronic devices (gnodes) configured to perform any or a combination of creating, receiving, and transmitting information over a communication channel communicatively coupled to a plurality of user equipments. The one or more hardware accelerators are configured by an Layer 1 (L1) module to process the information received over the communication in accordance with an uplink and a downlink configuration instruction received every predefined transit time interval (TTI) received from an Layer 2 (L2) module associated with a network. The L1 module is associated with a physical (PHY) layer of the network, and the L2 module is associated with a data link layer of the network. The method may further include the step of extracting, from the one or more discrepancies, a set of attributes pertaining if to out-of-range attributes received from the L2 module or unexpected attributes passed on by the L1 module to the one or more hardware accelerators in the predefined TTI that leads to the one or more hardware accelerator to take excess cycles to complete processing the information or not complete at all. Based on the set of attributes extracted, the method may include the step of resetting any or a combination of one or more queues in the hardware accelerator and a core of the hardware accelerator. The reset may take a predefined outage time interval such that the predefined outage time interval is less than an expiry time associated with a Radio-Link Failure Timer (T310) timer coupled to the network and resetting the any or a combination of one or more queues in the hardware accelerator and the core of the hardware accelerator may be performed in parallel with simultaneously performing a request-response communication by the L1 module with the L2 module for a predefined interval of time. The request-response communication may include sending an error message to L2 module, such that L2 module deactivates functioning of the L1 module until the combination of one or more queues in the hardware accelerator and the core of the hardware accelerator are restarted, and the plurality of UEs in the cell may be configured to be in a radio resource connect (RRC) connected state since the predefined outage time interval is less than the expiry time of the T310 timer.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides an efficient and reliable systems and methods for facilitating fail safe possibilities in a network by exploiting 3GPP defined Radio Resource Control (RRC) T310 (Radio-Link Failure Timer), N310 (Radio-Link Failure Counter), T311 (Radio Link Re-establishment Timer), N311 (Radio Link Re-establishment Counter) Timers and associated Counters to enable the L1 to recover within the combined duration of the sum of T310 and T311 timers, for example, typically, 100 msec following a L1 SW exception event.

Figure 1:
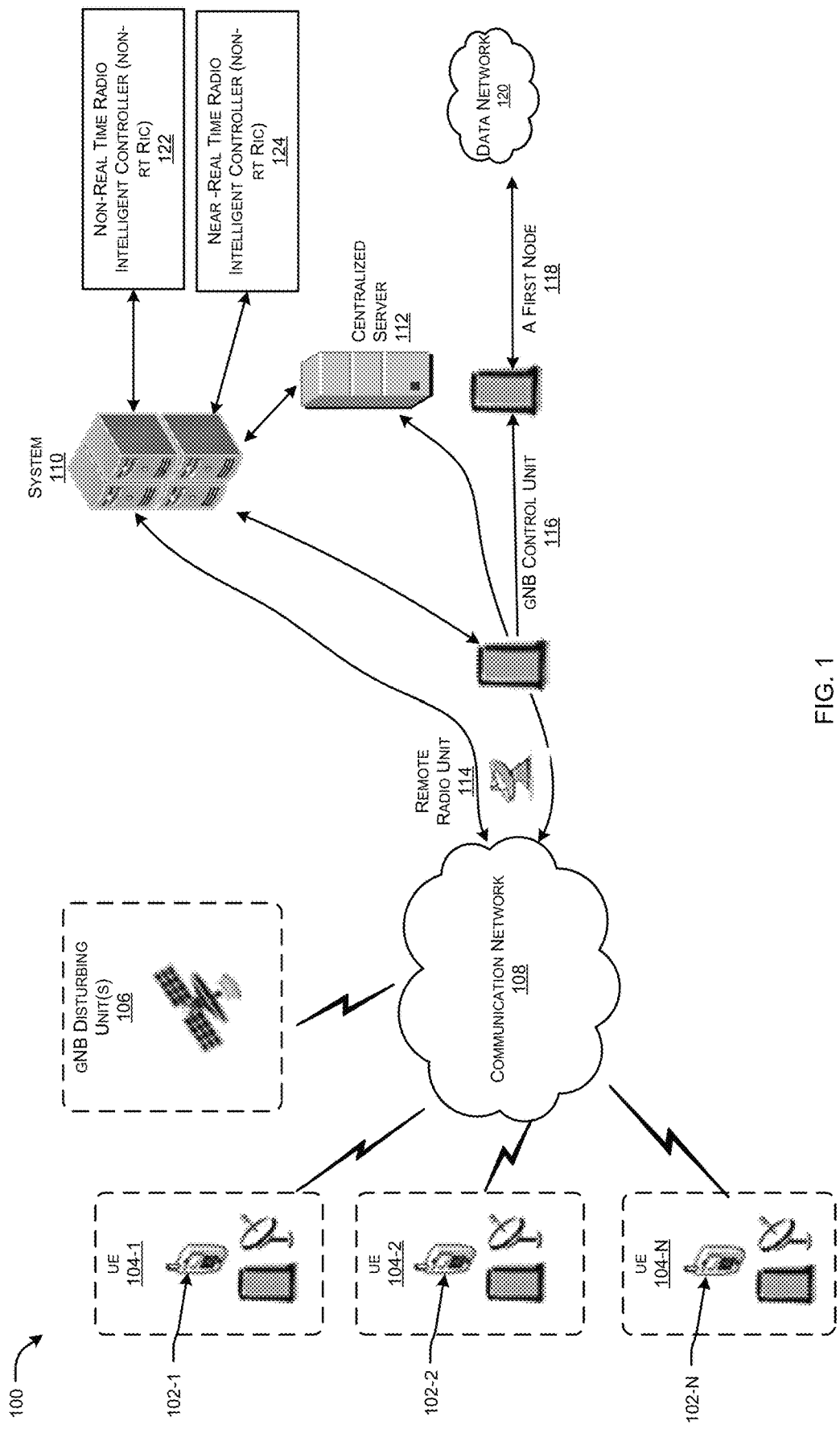
FIG. 1 illustrates an exemplary system architecture in which or with which proposed system of the present disclosure can be implemented, in accordance with an embodiment of the present disclosure.

Referring to FIG. 1 that illustrates an exemplary network architecture for a wireless network (100) (also referred to as network architecture (100)) in which or with which the system (110) of the present disclosure can be implemented, in accordance with an embodiment of the present disclosure. As illustrated, the exemplary network architecture (100) may be equipped with a Radio Resource Control (RRC), a T310 (Radio-Link Failure Timer), a N310 (Radio-Link Failure Counter), a T311 (Radio Link Re-establishment Timer), a N311 (Radio Link Re-establishment Counter). The system (110) may be communicatively coupled to a plurality of first computing devices (102-1, 102-2, 102-3 . . . 102-N)—interchangeably referred to as user equipment (102-1, 102-2, 102-3 . . . 102-N) and (individually referred to as the user equipment (UE) (102) and collectively referred to as the UE (102)) through a second computing devices (104-1, 104-2, . . . 104-N) (interchangeably referred to as the base station (104-1, 104-2, . . . 104-N) and individually referred to as the base station (104) and collectively as base stations (104)) and the system (110) may be further operatively coupled to the base stations (104) via an open radio access network Radio Unit (O-RU) (114). The system (110) may be further communicatively coupled to the one or more third computing devices (106) (interchangeably referred to as gNB distributed units (DU) or gNB DU 106), and one or more fourth computing devices (116) (interchangeably referred to as gNB control units (CU) or gNB CU 116). The one or more fourth computing devices (116) may be communicatively coupled to a plurality of fifth computing devices (118) (interchangeably referred to as first nodes (118) hereinafter). The one or more third computing devices (106) or gNB DU (106) may be satellites or any non-terrestrial deployments but not limited to the like.

In an exemplary implementation, a predefined expiry time of a radio-link failure timer (also referred to as T310) can be at least 100 msec. Due to this momentary time, the UEs (102) connected to the cell and doing throughput with various traffic profiles can experience a momentary disruption if an unexpected L1 software (SW) event were to occur due to which a Radio-link-Failure (RLF) will be experienced by the UEs (102) within 100 msec. Since the RLF duration is within the T310 timer duration, typically 100 msec, the UEs (102) will remain in RRC CONNECTED state and will not go to RRC IDLE state. Thus, none of the active UEs will drop connection, and will only experience momentary (100 msec) outage as well as loss of throughput.

The system may further include one or more hardware accelerators communicatively coupled to the one or more gnodes (106), and may be configured by a Layer 1 (L1) module to process information received over a communication channel in accordance with an uplink and a downlink configuration instruction received every predefined transit time interval (TTI) received from an Layer 2 (L2) module associated with the network. The L1 module is associated with a physical (PHY) layer of the network, and wherein L2 module is associated with a data link layer of the network. The L1 module further comprises a processor that executes a set of executable instructions that are stored in a memory, upon execution of which, the processor causes the L1 layer to monitor, one or more discrepancies in the information received by the one or more Hardware Accelerators. The L1 module then can extract, from the one or more discrepancies, a set of attributes pertaining if to out-of-range attributes received from the L2 module or unexpected attributes passed on by the L1 module to the one or more Hardware Accelerators in the predefined TTI that leads to the one or more Hardware Accelerator to take excess cycles to complete processing the information or not complete at all. Based on the set of attributes extracted, the L1 module then can reset any or a combination of one or more queues in the Hardware Accelerator and a core of the Hardware Accelerator core. The reset can take a predefined outage time interval such that the predefined outage time interval is less than an expiry time associated with a T310 timer coupled to the network, and resetting the any or a combination of one or more queues in the Hardware Accelerator and a core of the Hardware Accelerator can be performed in parallel with simultaneously performing a request-response communication by the L1 module with the L2 module for a predefined interval of time. The request-response communication may include sending an error message to L2 module and the L2 module can deactivate functioning of the L1 module until the combination of one or more queues in the Hardware Accelerator and the core of the Hardware Accelerator core are restarted. The plurality of UEs in the cell can be configured to be in a radio resource connect (RRC) connected state since the predefined outage time interval is less than the expiry time of the T310 timer.

In an exemplary embodiment, the plurality of UEs connected to the network experiences a Radio-Link-Failure for a second time interval, the time of the second time interval is less than the time of predefined outage time interval.

In an exemplary embodiment, the plurality of UEs connected to the network does not go to RRC IDLE state.

In an exemplary embodiment, the request-response communication further includes stopping a real-time down-link (DL), an uplink (UL) processing chain, and moving of L1 module from a RUNNING State to an IDLE State. The L1 module may respond back with a physical stop response message to the L2 module. The request-response also includes deactivation of the L1 module by the L2 module, where the L1 module continues to perform any or a combination of sending SLOT INDICATIONS in order to keep an L2 scheduler from system frame number (SFN) ticking, not letting L2 module clear one or more contexts associated with the plurality of UEs and the plurality of databases associated with the plurality of UEs. The L2 module then may send a new CONFGURE CELL REQUEST with one or more predefined CELL attributes, wherein the one or more predefined CELL attributed are associated with the attributes that had been used to originally configure the L1 module. The L1 module then can configure the DL and the UL processing chain of the L1 module and moves to a CONFIGURED State, wherein the L1 module sends a CONFIGURE CELL RESPONSE message to the L2 module post moving into the CONFIGURED state.

The request-response communication includes sending by the L2 module a PHY START message to restart the cell at a predetermined SFN (System Frame Number) obtained from the SLOT INDICATIONS. The L1 module then can reset the plurality of databases and can restart the real-time DL and UL processing chains and then sends a PHY RESPONSE message to the L2 module.

In an exemplary embodiment, the system (110) completes request-response communication within the predefined expiry time T310 and a second predefined time (T311) timers duration of time-out put together. The predefined interval of time of the request-response communication is less than or at least equal to the predefined outage time interval.

In an exemplary embodiment, the system (110) can avoid reloading a predefined channels associated with one or more look-up tables for a plurality of physical signals defined by but not limited to 5G L1 wireless protocol from a File input/output (File I/O) operations which will take in a predefined hundreds of microseconds for each loading since it is slow File I/O operation and instead to save them the initially loaded look-up table in a secure memory when the cell is UP the first time and retrieve them from memory for the L1 SW operations.

In an exemplary embodiment, a communication network (108) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

Figure 2:
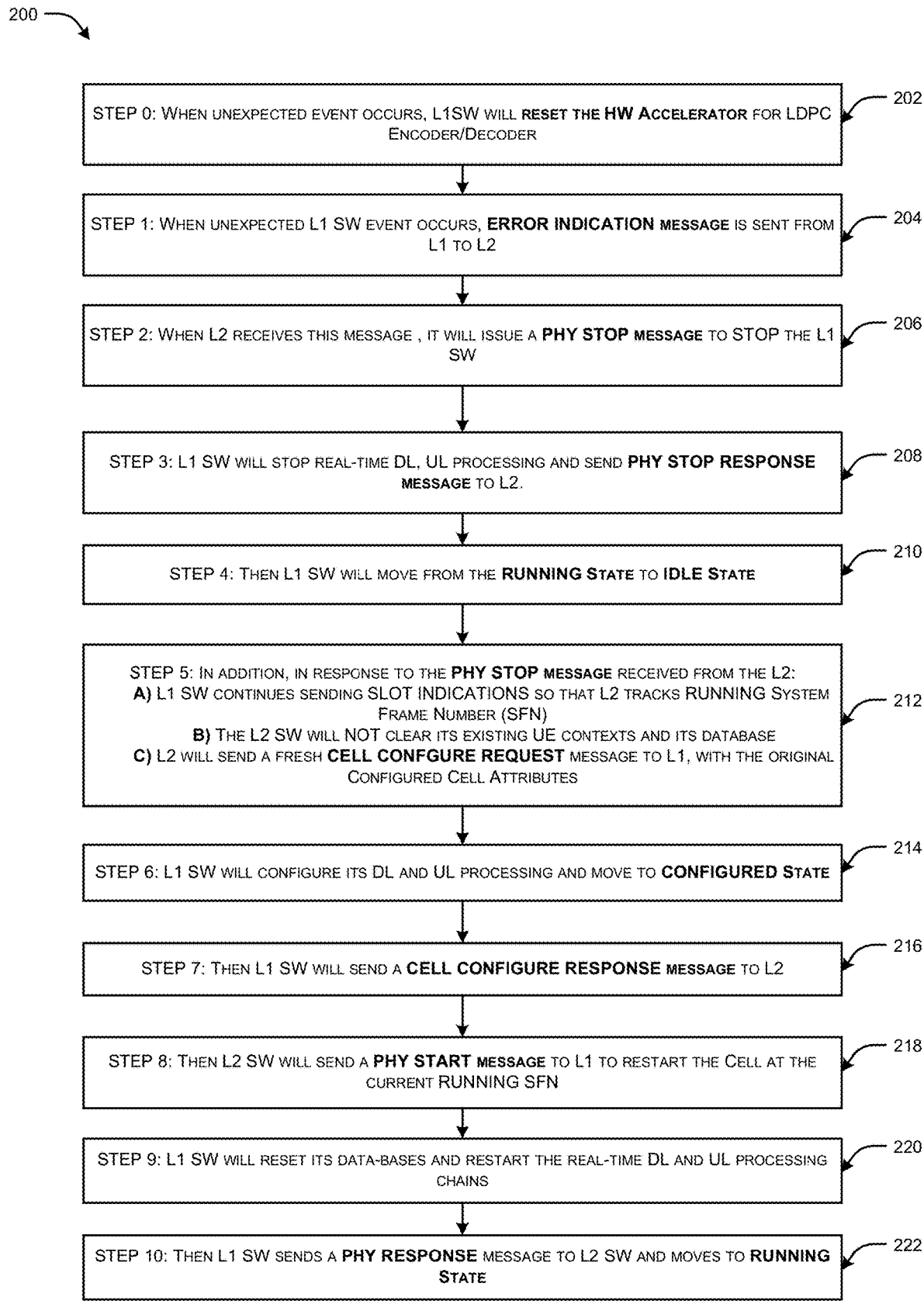
FIG. 2 illustrates an exemplary representation of the flow diagram associated with the proposed method, in accordance with an embodiment of the present disclosure.

FIG. 2 illustrates an exemplary representation of the flow diagram associated with the proposed method, in accordance with an embodiment of the present disclosure.

As illustrated, the proposed method comprises of a plurality of steps that may include at 204 reaching an unexpected state in the L1 SW or an unexpected event or unexpected attribute in a state is encountered, an ERROR INDICATION message is notified from L1 SW to L2 SW, to indicate to the L2 SW that an unrecoverable error condition has been hit and the L2 SW will have to operate the FAIL SAFE defense procedure to start the Cell closing process in order to restart the L1 SW Cell transmission and reception afresh. In this process the L1 SW will terminate all current ongoing Uplink (UL) and Downlink (DL) tasks and also not schedule any pending tasks of UL and DL in that 0.5 msec (for 5G mu=1 topology) Transmit Transmission Interval (TTI).

At 206 the method may include sending a STOP message to the L1 SW when L2 SW receives an ERROR INDICATION message from L1 SW. The L1 SW is the software layer that provides services to the L2 SW and therefore the L2 SW is the Master of the L1 SW.

At 208 the method may include executing the PHY STOP service provided by L1 SW and all the Uplink and Downlink processing tasks will be closed and the L1SW will gracefully exit L1 UL and DL processing from that 0.5 msec TTI System Frame Number onwards. Following this the L1 SW sends PHY STOP RESPONSE to the L2 SW.

At 210 the method may include reinitializing by the L1 SW, all its UL and DL structures, contexts and pointers so that the L1 SW will likely be reset completely from its unexpected condition encountered in Step 1. And the state of the L1 SW is changed from RUNNING State to IDLE State.

At 212, the method may include continuing by the L1 SW to send 0.5 msec SLOT INDICATIONS to the L2 SW even after it has received a PHY STOP and its UL and DL processing chains have been stopped in Step 3-4. This is necessary since the L1 SW is the Timing Master and has to provide the 0.5 msec SLOT INDICATIONS as timing ticks to the L2 SW so that the L2 SW timing (running or current System Frame Number (SFN)) and the User Equipment (UE) Timing continue to be in synchronization when the Cell is eventually restarted in STEP 10.

At 212, the method may include retaining by the L2 SW, all the UE contexts of the UEs currently connected in the system when Step 1 was encountered as well as the L2 SW will keep its scheduler ticking with every SLOT INDICATION ticks. Though the L1 SW has stopped running, all the UE contexts will be maintained ACTIVE in the L2 SW until the sum of T310 and T311 timers expires. Meanwhile, L2 SW will then send a fresh CONFIG REQUEST message to configure the L1 SW with the same cell attributes that was used to configure the cell originally.

At 214, the method may include, configuring the L1 SW DL and UL processing chains again as well as change its software state from IDLE State to CONFIGURED State by the L1 SW upon receiving the CELL CONFIG REQUEST message from the L2 SW.

At 216, the method may include, sending by the L1 SW upon successful configuration of the cell, a response message called CELL CONFIG RESPONSE message to the L2 SW.

At 218, the method may include, starting the L1 SW at the current running SFN by the L2 SW upon receiving a successful CELL CONFIG RESPONSE message, by sending a PHY START message to it.

At 220, the method may include, resetting the DL and UL processing chain and its related task contexts and pointers and prepare itself to process the DL transmit and UL received packets every 0.5 ms TTI by the L1 SW upon receiving the PHY START message.

At 222, the method may further include, sending by the L1 SW, a PHY RESPONSE message to indicate that the L1 SW is now in RUNNING State and starts processing the DL Transmit packets and UL received packets every 0.5 ms TTI, as per the DL CONFIG REQUEST and UL CONFIG REQUEST configuration messages received respectively from the L2 SW.

In an exemplary embodiment, the attributes can be checked by the L1 SW and if it is in error or any other unexpected cases are encountered wherein the HW accelerator is taking too many cycles to complete, a Step of 202 will be triggered by L1 SW which will reset the queues in the Hardware Accelerator as well as the Hardware Accelerator core and restart it. This reset of Step 0 will typically be completed within 100 msec during which time the Step 202-220 is being executed in parallel. Thus, the Cell will be recovered within the outage of 100 msec (sum of T310 and T311 timers) and thereby ensure minimal impact in terms of Cell outage and KPI degradation is achieved as described in the earlier methods above.

Thus, the present disclosure provides for a unique and efficient system that facilitates FAIL SAFE methods in a network and ensures minimal impact in terms of Cell outage and KPI degradation.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides for an approach to build a Network where the Nodes FAIL SAFE.

The present disclosure provides for a system that facilitates minimal Network Outage time such that the Network KPIs are impacted as minimal as possible.

The present disclosure provides for a method that enables L1 SW to meet the High Availability and is a defense for gNodeB against any unexpected L1 SW exception in live deployments.

What is claimed is:

1. A system for facilitating minimal cell outage and minimal key performance indicators (KPI) degradation by ensuring fail safe nodes, said system comprising:
    a cell comprising:
        a plurality of user equipments communicatively coupled to a network;
        one or more electronic devices in the network, the one or more electronic devices configured to perform any or a combination of creating, receiving, and transmitting information over a communication channel communicatively coupled to the plurality of user equipments;
        one or more hardware accelerators communicatively coupled to the one or more electronic devices, wherein the one or more hardware accelerators are configured by a Layer 1 module to process the information received over the communication channel in accordance with an uplink and a downlink configuration instruction received every predefined transit time interval received from a Layer 2 module associated with the network, wherein the Layer 1 module is associated with a physical (PHY) layer of the network, and wherein the Layer 2 module is associated with a data link layer of the network, and wherein
            the Layer 1 module further comprises a processor that executes a set of executable instructions that are stored in a memory, upon execution of which, the processor causes the Layer 1 module to:
            monitor one or more discrepancies in the information received by the one or more hardware accelerators over the communication channel;
            extract, from the one or more discrepancies, a set of attributes pertaining to out-of-range attributes received from the Layer 2 module or unexpected attributes passed on by the Layer 1 module to the one or more hardware accelerators in every predefined transit time interval that leads to the one or more hardware accelerators to take excess cycles to complete processing the information or not complete at all;
            based on the set of attributes extracted, reset any or a combination of one or more queues in the one or more hardware accelerators and a core of the one or more hardware accelerators, wherein
                the reset takes a predefined outage time interval such that the predefined outage time interval is less than an expiry time associated with a radio-link failure timer coupled to the network, wherein resetting the any or the combination of the one or more queues in the one or more hardware accelerators and the core of the one or more hardware accelerators is performed in parallel with simultaneously performing a request-response communication for cell restart by the Layer 1 module with the Layer 2 module for a predefined interval of time, wherein the request-response communication for cell restart comprises sending an error indication message to the Layer 2 module,
            wherein the Layer 2 module deactivates functioning of the Layer 1 module until the combination of the one or more queues in the one or more hardware accelerators and the core of the one or more hardware accelerators are restarted, and wherein
            the plurality of user equipments in the cell are configured to remain in a radio resource connect (RRC) connected state since the predefined outage time interval is less than the expiry time of the radio-link failure timer.

2. The system as claimed in claim 1, wherein the plurality of user equipments connected to the network experiences a Radio-Link-Failure for a second time interval, and wherein time of said second time interval is less than time of the predefined outage time interval.

3. The system as claimed in claim 1, wherein the plurality of user equipments connected to the network does not go to RRC IDLE state.

4. The system as claimed in claim 1, wherein the request-response communication further includes stopping a real-time down-link processing chain, an uplink processing chain, and moving of the Layer 1 module from a RUNNING State to an IDLE State, and wherein the Layer 1 module responds back with a physical stop response message to the Layer 2 module.

5. The system as claimed in claim 4, wherein the request-response communication further includes deactivation of the Layer 1 module by the Layer 2 module, and wherein the Layer 1 module continues to perform sending SLOT INDICATIONS in order to continue to keep a Layer 2 scheduler from system frame number ticking, and not letting the Layer 2 module clear one or more contexts associated with the plurality of user equipments and a plurality of databases associated with the plurality of user equipments.

6. The system as claimed in claim 5, wherein the request-response communication further includes sending by the Layer 2 module a new CONFGURE CELL REQUEST with one or more predefined CELL attributes, and wherein the one or more predefined CEL attributes are associated with attributes used to originally configure the Layer 1 module.

7. The system as claimed in claim 6, wherein the request-response communication includes configuring the real-time down-link and the uplink processing chain of the Layer 1 module and moving to a CONFIGURED State, and wherein the Layer 1 module sends a CONFIGURE CELL RESPONSE message to the Layer 2 module post moving into the CONFIGURED state.

8. The system as claimed in claim 7, wherein the request-response communication includes sending by the Layer 2 module a PHY START message to restart the cell at a predetermined system frame number obtained from the SLOT INDICATIONS.

9. The system as claimed in claim 8, wherein the request-response communication further includes resetting by the Layer 1 module, the plurality of databases and restarting the real-time down-link and the uplink processing chains, and sending a PHY RESPONSE message to the Layer 2 module following which Layer 1 module moves to the RUNNING state.

10. The system as claimed in claim 1, wherein the predefined interval of time of the request-response communication for cell restart is less than or at least equal to the predefined outage time interval.

11. A method for facilitating minimal cell outage and minimal key performance indicators (KPI) degradation by ensuring fail safe nodes, said method comprising:
- monitoring one or more discrepancies in information received by one or more hardware accelerators, wherein the one or more hardware accelerators are communicatively coupled to one or more electronic devices, wherein the one or more electronic devices are configured to perform any or a combination of creating, receiving, and transmitting the information over a communication channel communicatively coupled to a plurality of user equipments;
- wherein the one or more hardware accelerators are configured by a Layer 1 module to process the information received over the communication channel in accordance with an uplink and a downlink configuration instruction received every predefined transit time interval received from a Layer 2 module associated with a network, wherein the Layer 1 module is associated with a physical (PHY) layer of the network, wherein Layer 2 module is associated with a data link layer of the network, and wherein the Layer 1 module further comprises a processor that executes a set of executable instructions that are stored in a memory;
- extracting, from the one or more discrepancies, a set of attributes pertaining to out-of-range attributes received from the Layer 2 module or unexpected attributes passed on by the Layer 1 module to the one or more hardware accelerators in every predefined transit time interval that leads to the one or more hardware accelerators to take excess cycles to complete processing the information or not complete at all;
- based on the set of attributes extracted, resetting any or a combination of one or more queues in the one or more hardware accelerators and a core of the one or more hardware accelerators,
- wherein the reset takes a predefined outage time interval such that the predefined outage time interval is less than an expiry time associated with a Radio-Link Failure Timer coupled to the network,
- wherein resetting the any or the combination of the one or more queues in the one or more hardware accelerators and the core of the one or more hardware accelerators is performed in parallel with simultaneously performing a request-response communication by the Layer 1 module with the Layer 2 module for a predefined interval of time, wherein the request-response communication for cell restart comprises sending an error indication message to the Layer 2 module,
- wherein the Layer 2 module deactivates functioning of the Layer 1 module until the combination of the one or more queues in the one or more hardware accelerators and the core of the one or more hardware accelerators are restarted, and
- wherein the plurality of user equipments in the cell are configured to remain in a radio resource connect (RRC) connected state since the predefined outage time interval is less than the expiry time of the Radio-Link Failure Timer.

12. The method as claimed in claim 11, wherein the plurality of user equipments connected to the network experiences a Radio-Link-Failure for a second time interval, wherein time of said second time interval is less than time of the predefined outage time interval.

13. The method as claimed in claim 11, wherein the plurality of user equipments connected to the network does not go to RRC DILE state.

14. The method as claimed in claim 11, wherein the request-response communication further includes stopping a real-time down-link processing chain, an uplink processing chain, and moving of the Layer 1 module from a RUNNING State to an IDLE State, and wherein the Layer 1 module responds back with a physical stop response message to the Layer 2 module.

15. The method as claimed in claim 14, wherein the request-response communication further includes deactivation of the Layer 1 module by the Layer 2 module, wherein the Layer 1 module continues to perform sending SLOT INDICATIONS in order to continue to keep a Layer 2 scheduler from system frame number ticking, and not letting the Layer 2 module clear one or more contexts associated with the plurality of user equipments and a plurality of databases associated with the plurality of user equipments.

16. The method as claimed in claim 15, wherein the request-response communication includes sending, by the Layer 2 module, a new CONFGURE CELL REQUEST with one or more predefined CELL attributes, wherein the one or more predefined CELL attributes are associated with attributes used to originally configure the Layer 1 module.

17. The method as claimed in claim 16, wherein the request-response communication includes configuring the real-time down-link and the uplink processing chain of the Layer 1 module and moving the Layer 1 module to a CONFIGURED State, wherein the Layer 1 module sends a CONFIGURE CELL RESPONSE message to the Layer 2 module post moving into the CONFIGURED state.

18. The method as claimed in claim 17, wherein the request-response communication includes sending, by the Layer 2 module, a PHY START message to restart the cell at a predetermined system frame number obtained from the SLOT INDICATIONS.

19. The method as claimed in claim 18, wherein the request-response communication further includes resetting, by the Layer 1 module, the plurality of databases and restarting the real-time down-link and the uplink processing chains, and sending a PHY RESPONSE message to the Layer 2 module following which Layer 1 module moves to the RUNNING state.

20. The method as claimed in claim 11, wherein the predefined interval of time of the request-response communication for cell restart is less than or at least equal to the predefined outage time interval.

* * * * *